3,605,317
WEIGHTLESS, WEEDLESS FISHING FLY
John R. Pobst, 2701 Forest Lake Drive,
Jackson, Mich. 49203
Filed Sept. 4, 1968, Ser. No. 757,319
Int. Cl. A01k 85/00
U.S. Cl. 43—42.25    7 Claims

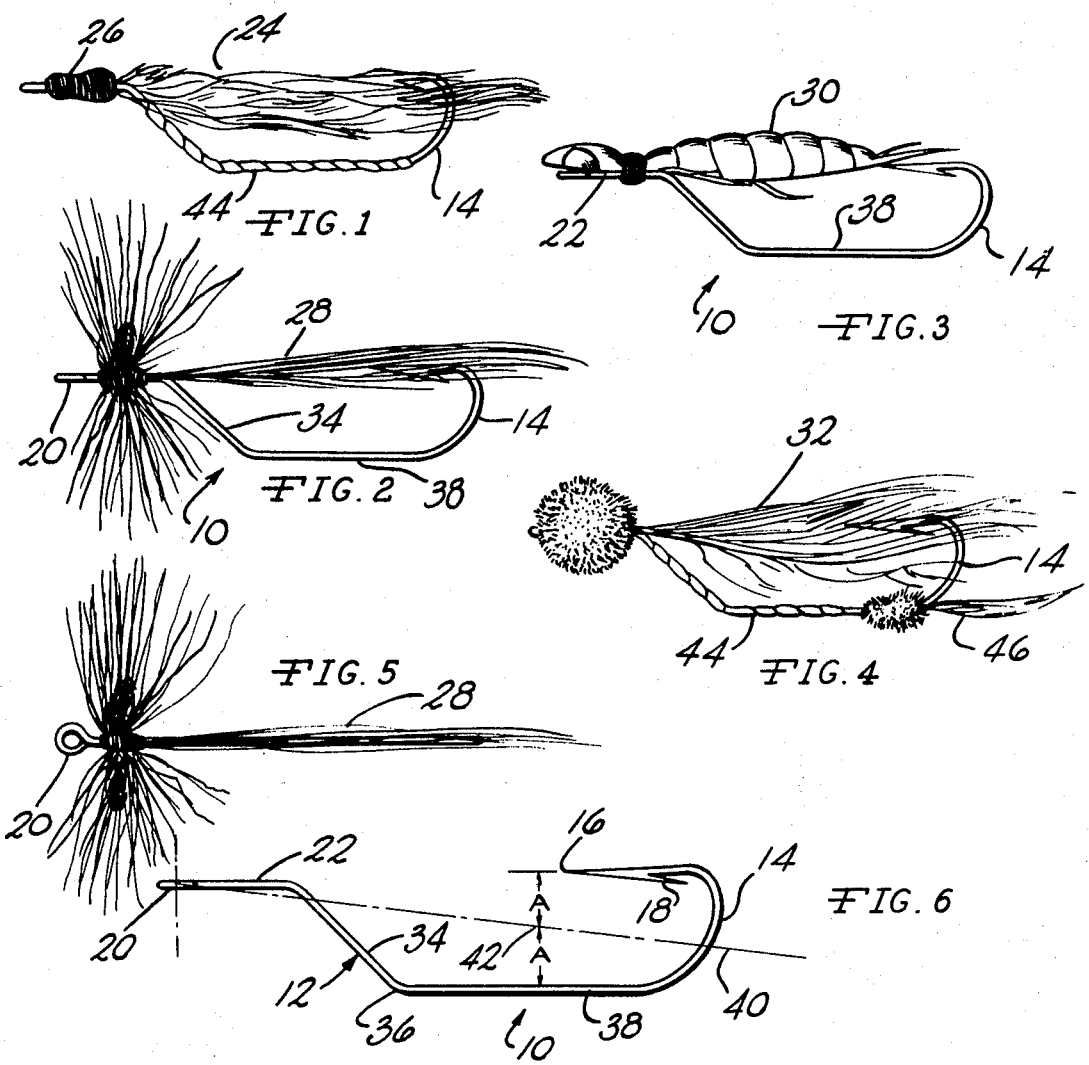
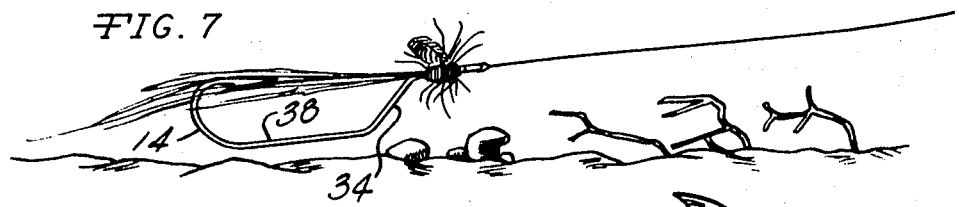
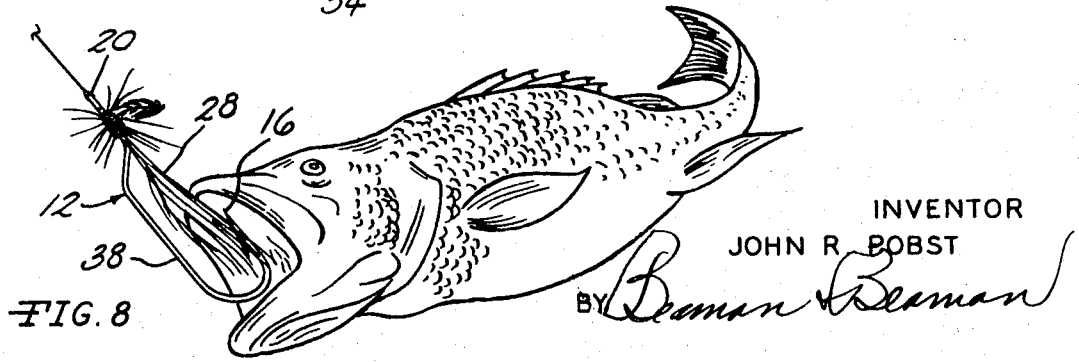

ABSTRACT OF THE DISCLOSURE

A fishing lure of the fly fishing type comprising a hook having a shank portion adjacent the hook eye to which the fly material is affixed. The barbed end of the hook is in general alignment with this shank portion and the fly material extends toward and shields the barb. The weight, shape and distribution of the fly material is so related to the hook configuration, that the majority of the weight of the hook and lure lies below the fly material causing the hook to function as a keel.

BACKGROUND OF THE INVENTION

The invention pertains to the field of art known as fly rod lures wherein the lure is very light, and the weight of the fishing line is used in the deployment and placing of the lure. Due to the ability of the novel lure to prevent undesired snagging of the hook, the lure falls into that category generally known as "weedless."

To the present date, fly fishing lures of the "weedless" type have not enjoyed widespread acceptance for several reasons. One of the primary disadvantages of prior art "weedless" fishing lures lies in the weight that the usual weedless apparatus adds to the lure. Additionally, in that fly fishing lures must realistically represent an insect or other conventional fish food, the addition to lures of hook protectors to render the lures weedless often detracts from the appearance of the lure as to harm the ability of the lure to attract fish.

A number of attempts have been made to render fly fishing lures weedless without adding significant weight to the lure, and such attempts are represented by United States Patents 1,480,766; 1,635,644 and 2,033,530. Such lures as illustrated in these patents have not enjoyed commercial success for various reasons. For instance, lures constructed in accordance with these patents do not have a realistic appearance, do not permit a versatility of lure manufacture as is necessary to attract fish under various conditions, and do not meet all the requirements necessary in a fly fishing lure.

None of the prior art fly fishing lures appear to have appreciated the fact that the arrangement of a specially formed hook with the fly material could produce a "keel" effect to orient the fly in a predetermined manner when the fly is in the water or falling through the air. The United States Patent to Williams, 3,023,536, illustrates a specially shaped hook used with a fly material. However, the hook used with this fly is not of the configuration employed in the practice of the invention; the fly does not have the weight distribution to insure "keeling" and any weedless characteristics of this lure are apparently derived from the configuration of the hook, rather than the combination of the components of the lure.

SUMMARY OF THE INVENTION

It has been discovered that a fly fishing lure of unique and highly advantageous characteristics can be produced by using a specially shaped hook in conjunction with the proper type, shape and amount of fly material such that the fly material extends toward and protects the sharp or barbed end of the hook from snagging, yet may be deflected from its normal position upon the lure being struck by a fish as to expose the barb to the fish's mouth, and permit the lure to be set. The unique orientation of the lure when supported in the water as to prevent snagging derives from the combination of a lightweight fly material used in conjunction with a hook so related to the fly material, and of such a mass, as to form a "keel" with respect to the fly material and the barbed end, such that the lure barb will be disposed upwardly, and away from those obstacles found in fishing waters which conventionally snag lures.

The concepts of the invention may be used with all types of fly rod fishing lures. The inventive concept may be utilized in a wide variety of fishing lures using a number of types of fly material. The inventive concept may be used with both wet and dry flies, and with those fishing fly lures known as "nymphs," "spiders," parachutes," "streamers," "poppers," etc. In that all embodiments of the invention utilize the "keel" concept, and orient the barb upwardly with respect to the primary portion of the hook, snagging of the hook is substantially minimized over conventional fly fishing lures, and as the fly material is also disposed in relation to the barb as to protect the barb from snagging, efficient "weedless" characteristics are obtained.

It is possible to practice the inventive concept by using hooks of various configurations, since the desired "keel" effect is a result of the relation of weight distribution of all of the fly components. However, the preferred hook configuration is such that upon a fish being hooked the forces imposed upon the hook will be in a line substantially aligned with the fishing line adjacent the hook, and this feature in conjunction with the advantages of setting a fishing lure in the fish's mouth when the barb is turned in an "upward" direction, increases the possibility of hooking the fish in such a manner as to permit the best possible chance of successfully landing the catch.

BRIEF DESCRIPTION OF THE DRAWING

The aforementioned advantages of the invention will be better appreciated from the following description and accompanying drawing wherein:

FIG. 1 is an elevational view of a fly fishing lure of the streamer type utilizing the concepts of the invention, FIG. 2 is an elevational view of a lure in accord with the invention of the dry insect type using the inventive concepts, FIG. 3 is an elevational view of a fly fishing lure of the nymph type, FIG. 4 is an elevational view of a lure representing a minnow, FIG. 5 is a top view of the insect lure of FIG. 2, FIG. 6 is an enlarged view of the preferred construction of hook used in conjunction with the inventive concept, FIG. 7 is an elevational view illustrating the orientation of the lure in the water, and its orientation to foreign objects upon which lures are often snagged or inadvertently hooked, and FIG. 8 is an elevational view of a lure in accord with the invention upon being struck by a fish.

DESCRIPTION OF THE PREFERRED EMBODIMENTS

FIGS. 1 through 5 illustrate some of the types of fly fishing lures which may be produced using the inventive concept. FIGS. 1 and 4 illustrate lures of the streamer type, FIGS. 2 and 5 show a dry insect type lure, and FIG. 3 illustrates a nymph.

The inventive concept can best be appreciated by closely studying the preferred configuration of hook 10 used with the lure. The hook configuration is represented in FIG. 6. The hook is formed of conventional hook stock, usually having a circular cross sectional configuration. The hook consists of a shank, generally indicated at 12, and an arcuate hook portion 14, terminating in the sharp end 16, which will usually include a barb 18.

The end of the hook removed from the sharp end 16 is formed in the shape of the usual eye 20 to which the fish line, or leader, may be attached.

That portion of the shank 12 adjacent the eye 20 constitutes a first portion 22 to which the fly material is attached. Thus, in the embodiment of FIG. 1 the streamer material 24 is affixed to the shank portion 22 by the usual windings 26 of thread used in the construction of flies. In a like manner the fly material 28 of the embodiment of FIG. 2 is also attached to the hook shank portion 22. In the nymph construction of FIG. 3 the fly material is in the form of a molded rubber flexible plastic body 30 which represents a bug or other conventional fish bait. This type of fly material is also affixed to the hook shank portion 22 in a conventional manner. Likewise, the fly material 32 of FIG. 4, representing a minnow, is also attached to the shank 22 in a conventional manner.

A second shank portion 34 depends from the shank portion 22 in a manner apparent from FIG. 6. It will be noted that the portion 34 extends at an acute angle from the longitudinal length of the portion 22, and also extends away from the eye 20.

The portion 34 terminates at the bend 36 from which depends a third shank portion 38 which extends in a longitudinal direction of the shank portion 22. In the preferred embodiment, the shank portions 22 and 38 are of a linear configuration, and are substantially parallel. However, deviations in this relationship are possible within the scope of the inventive concept.

The arcuate hook portion 14 depends from the shank portion 38, and is bent "upwardly" toward the projection of the longitudinal length of the shank portion 22. In this manner, the sharp end 16 is disposed substantially in alignment with the longitudinal projection of the longitudinal length of the portion 22 or slightly therabove.

It is possible to wind a reflecting foil 44 about the shank portion 38, as represented in the embodiments of FIGS. 1 and 4, and also add fly material 46 to the shank portion 38 as represented in the embodiment of FIG. 4, without departing from the concept of the invention.

It will be appreciated that in a hook of the configuration illustrated in FIG. 6 that the center of gravity of such a hook lies below a line constituting the projection of the longitudinal length of the shank portion 22, and the longitudinal length of the shank portion 22 can, in a sense, be considered an axis of the fly when the lightweight fly material is affixed to the shank portion 22 and extends substantially in alignment with the sharp end 16 of the hook, as illustrated in the disclosed embodiments. The shank portions 34 and 38, and the arcuate hook portion provide the mass that forms the keel and over ⅔ of the weight of the hook is used to define the keel portion of the lure. When the fly material is attached to the shank portion 22, as in the disclosed embodiments, it is desired that the weight of the lure below a line 40 drawn through the eye 20 and a point 42 located half way between the sharp end 16 and the shortest distance from the sharp end to the third portion 38 constitute at least 50% of the total weight of the hook. Thus, such a weight distribution will place the center of gravity of the total fly well below the lightweight fly material and the length of shank portion 22, and the hook portions 34 and 38, and the arcuate hook portion 14 adjacent the portion 38 function as a "keel" to maintain the lure in the orientation illustrated in FIG. 7 such that the sharp point of the hook will be disposed "upwardly" away from objects such as rocks, and sticks found upon stream beds and other fishing locations.

The "keel" effect of the unique configuration of the hook, and its relationship with the lightweight fly material, orients the lure in the illustrated manner, FIG. 7, regardless of whether the lure is of the "wet" type, or is a "dry" fly which would rest upon the surface of the water.

The orientation of the lure is augmented by the movement of the water past the lure. This movement may occur due to the fisherman pulling in upon the line, or due to the current of the stream in which fly fishing usually occurs. As relative movement between the water and lure takes place the lure may sway from side to side about the axis of the shank portion 22, but will remain oriented such that the sharp end 16 is located above the shank portion 38.

With a "dry" fly, as shown in FIG. 2, the keel action of the fly weight distribution also tends to dispose the hook portion 38 below the fly material as the fly falls through the air before settling on the water. Thus, even though the hook may not break through the surface tension of the water the fly will be properly oriented to hook the upper jaw of a striking fish.

From the aspect of hooking and retaining a fish striking the lure in accord with the invention, very desirable results are achieved. In that the sharp end 16 will always be disposed upwardly with respect to the shank portion 38, a fish striking the lure, as represented in FIG. 8, will deflect the fly material toward the shank portion 38 and expose the sharp end 16 to the upper jaw. The initial striking of the lure will be sensed by the fisherman who will "set" the hook by pulling on the fish line. In that the sharp end 16 is in substantial alignment with the shank portion 22 a direct force is applied to the sharp end in line with the shank portion 22. This advantage, in conjunction with the initial orientation of the hook while being struck, substantially increases the likelihood of achieving a secure hooking into the upper jaw of the fish as compared with lures wherein no predetermined orientation of the hook and lure exists when the lure is struck.

Several essential relationships are necessary in the practice of the inventive concept. First, the hook must be of such a shape that the center of gravity is disposed well out of alignment with a line defined by the shank portion at the eye. As the center of gravity of the assembled fly must be below this line, the weight and mass distribution of the hook must be sufficient to compensate for the "lifting" of the center of gravity when the fly material is attached to the hook. Secondly, the weight of the fly material must be so related to the mass and weight distribution of the hook to keep the total center of gravity below the line of the first shank portion 22, which also generally corresponds to the axis of the fly material and is approximately the longitudinal pivoting axis of the fly. Third, the fly material must be so related to the hook barbed end 16 as to shield the hook from snagging, and yet must be able to be readily pushed past the end 16 when the lure is struck. The success of the invention requires the proper relationship of these factors.

It is appreciated that various modifications to the inventive concept may be apparent to those skilled in the art without departing from the spirit of the invention, and it is intended that the inventive concept be defined only by the following claims.

I claim:

1. A fly fishing lure characterized by its light weight and ability to resist snagging comprising, in combination, a hook having a shank, an eye defined at an end of said shank, said shank including a first portion disposed adjacent said eye and having a longitudinal length, a second shank portion depending from said first portion and angularly disposed to said first portion and the longitudinal length thereof, a third shank portion depending from said second portion in the general direction of the longitudinal length of said first shank portion and away from said eye, an arcuate hook portion depending from said third portion, and extending toward the projection of the longitudinal length of said first shank portion, said hook portion including a sharp end extending toward said first shank portion and said eye, and a lightweight, resilient fly material affixed to said first shank portion in substantial alignment therewith and extending toward said sharp end to shield said sharp end from snagging, said second and third portions extending from and below said fly material, respectively, and of such weight as to locate the center of gravity of the lure below the projection of said first portion and below said fly material whereby said second and third portions function as a keel when said lure is in the water to maintain said second and third portions below said fly material and orient said sharp end above said third portion, at least 50% of the total weight of the hook occurring on the side of an imaginary line drawn through said eye and a point one-half the shortest distance between said sharp end and said third portion remote from said sharp end.

2. In a fly fishing lure as in claim 1 wherein said first and said third shank portions are substantially linear in configuration and said third portion is substantially parallel to said first shank portion.

3. In a fly fishing lure as in claim 2 wherein said hook portion sharp end is substantially aligned with the longitudinal length of said first shank portion.

4. In a fly fishing lure as in claim 1 wherein said fly material comprises resilient filaments substantially encompassing said hook portion sharp end.

5. In a fly fishing lure as in claim 1 wherein said fly material comprises a resilient molded body terminating short of said hook portion sharp end and spaced from said third shank portion whereby said body may be deflected past said sharp end toward said shank third portion.

6. A fly fishing lure characterized by its light weight and ability to resist snagging comprising, in combination, a hook having a shank, an eye defined at one end of said shank and a sharp point defined at the other end, a hooked arcuate portion defined on said shank adjacent said sharp point extending said point in the general direction of said eye, an elongated fly material mounting portion defined on said shank adjacent said eye and in substantial alignment with said sharp point defining a pivot axis for said lure, a deflectable fly material mounted on said mounting portion having an unsupported portion extending toward said sharp point and protecting said point from inadvertent snagging, said hook shank having a configuration including an intermediate portion offset with respect to said fly material and extending therefrom, and offset with respect to said pivot axis, said intermediate portion having a greater weight than said mounting portion and fly material whereby the center of gravity of the lure lies between said intermediate portion and said pivot axis and said intermediate portion functions as a keel with respect to said fly material and pivot axis, said hooked arcuate portion being located between said intermediate portion and said sharp point and being disposed upwardly in the normal orientation of said fly when in the water, at least one half of the total weight of the lure lying below a line extending from said eye through the center of the bight of the arcuate hooked portion and sharp point.

7. A hook to be used in a fly fishing lure having fly material affixed thereon comprising, in combination, an elongated fly material receiving substantially linear first shank portion having an end terminating in an eye, a substantially linear second shank portion depending from said first portion and angularly disposed to said first portion and the longitudinal length thereof, a substantially linear third shank portion depending from said second portion in substantial parallel relation to the longitudinal length of said first shank portion and away from said eye, an arcuate hook portion depending from said third portion and extending toward the projection of the longitudinal length of said first shank portion, a sharp end extending from said arcuate hook portion toward said first shank portion and said eye and in substantial alignment with the length of said first portion whereby fly material affixed upon said first portion extending in the direction of the length of said first portion will extend toward said sharp end, the weight of said second and third portions, and the weight of said arcuate hook portion comprising at least ⅔ of the weight of the hook, and at least 50% of the total weight of the hook occurring on the side of an imaginary line drawn through said eye and a point one-half the shortest distance between said sharp end and said third portion remote from said sharp end.

References Cited
UNITED STATES PATENTS

| | | | |
|---|---|---|---|
| 1,635,644 | 7/1927 | Sloan | 43—42.25 |
| 2,199,001 | 4/1940 | Khoenle | 43—42.4X |
| 3,352,051 | 11/1967 | Stewart | 43—42.1 |
| 2,164,807 | 7/1939 | Evans | 43—43.16 |
| 2,938,295 | 5/1960 | Watson | 43—43.2 |
| 3,023,536 | 3/1962 | Williams | 43—43.2 |

ALDRICH F. MEDBERY, Primary Examiner

D. J. LEACH, Assistant Examiner

U.S. Cl. X.R.

43—42.1, 42.43, 43.2